(12) United States Patent
Heiling et al.

(10) Patent No.: US 10,841,128 B2
(45) Date of Patent: Nov. 17, 2020

(54) SYSTEM AND METHOD TO TRANSMIT DATA OVER A BUS SYSTEM

(71) Applicant: Infineon Technologies AG, Neubiberg (DE)

(72) Inventors: Christian Heiling, Graz (AT); Heimo Hartlieb, Graz (AT); Michael Hausmann, Gleisdorf (AT)

(73) Assignee: INFINEON TECHNOLOGIES AG, Neubiberg (DE)

( * ) Notice: Subject to any disclaimer, the term of this patent is extended or adjusted under 35 U.S.C. 154(b) by 177 days.

(21) Appl. No.: 16/200,169

(22) Filed: Nov. 26, 2018

(65) Prior Publication Data

US 2019/0097837 A1 Mar. 28, 2019

Related U.S. Application Data

(63) Continuation of application No. 13/480,281, filed on May 24, 2012, now Pat. No. 10,142,124.

(51) Int. Cl.
*H04L 12/40* (2006.01)

(52) U.S. Cl.
CPC .......... *H04L 12/40039* (2013.01); *H04L 2012/40215* (2013.01); *H04L 2012/40273* (2013.01)

(58) Field of Classification Search
CPC ......... H04L 12/40019; H04L 12/40123; H04L 2012/40228; H04L 41/0806; G06F 11/2028; G06F 13/4282; G06F 15/7867; G06F 13/385; G06F 3/04847
USPC ........ 370/248, 217, 216, 220; 710/110, 305, 710/14, 11, 8, 104; 712/15; 709/220, 709/221

See application file for complete search history.

(56) References Cited

U.S. PATENT DOCUMENTS

| | | | |
|---|---|---|---|
| 4,634,110 A | 1/1987 | Julich et al. | |
| 4,852,043 A | 7/1989 | Guest | |
| 5,053,964 A * | 10/1991 | Mister | B60L 15/38 246/187 C |
| 5,214,775 A | 5/1993 | Yabushita et al. | |
| 5,287,010 A | 2/1994 | Hagiwara | |
| 5,491,787 A | 2/1996 | Hashemi | |
| 5,751,220 A * | 5/1998 | Ghaffari | H04Q 9/04 340/12.31 |
| 5,752,047 A | 5/1998 | Darty et al. | |
| 5,822,512 A | 10/1998 | Goodrum et al. | |
| 5,918,023 A | 6/1999 | Reeves et al. | |
| 5,966,304 A | 10/1999 | Cook et al. | |
| 6,055,228 A | 4/2000 | DeKoning et al. | |
| 6,141,350 A * | 10/2000 | Mahale | H04J 3/0688 370/438 |
| 6,351,829 B1 | 2/2002 | Dupont et al. | |

(Continued)

FOREIGN PATENT DOCUMENTS

| | | |
|---|---|---|
| CN | 101013314 A | 8/2007 |
| CN | 101722949 A | 6/2010 |
| WO | 2011032926 A1 | 3/2011 |

*Primary Examiner* — Faisal M Zaman
(74) *Attorney, Agent, or Firm* — Slater Matsil, LLP (57) ABSTRACT

A system includes a bus system to connect a number of components in a chain-like structure. A first control device (e.g., microcontroller or microprocessor) is configured to control the components in a first mode of the system. A second control device (e.g., microcontroller or microprocessor) is configured to control a first subset of the components in a second mode of the system.

20 Claims, 4 Drawing Sheets

(56) References Cited

U.S. PATENT DOCUMENTS

| | | | |
|---|---|---|---|
| 6,363,464 B1 | 3/2002 | Mangione | |
| 6,574,477 B1 | 6/2003 | Rathunde | |
| 6,591,150 B1 | 7/2003 | Shirota | |
| 6,670,882 B1 * | 12/2003 | Bachar | H04L 12/403 |
| | | | 340/2.81 |
| 6,697,897 B1 | 2/2004 | Friel et al. | |
| 7,281,070 B2 * | 10/2007 | Bomhoff | G06F 13/4286 |
| | | | 370/475 |
| 7,391,437 B2 * | 6/2008 | Aldrich | H04N 5/772 |
| | | | 348/207.99 |
| 7,613,844 B2 * | 11/2009 | Ohnishi | H04N 21/47202 |
| | | | 710/14 |
| 7,724,642 B2 | 5/2010 | Lum | |
| 7,792,016 B2 | 9/2010 | Arai et al. | |
| 8,069,328 B2 * | 11/2011 | Pyeon | G11C 7/20 |
| | | | 711/170 |
| 8,074,105 B2 | 12/2011 | Kalwitz et al. | |
| 8,149,691 B1 | 4/2012 | Chadalavada et al. | |
| 8,296,366 B2 * | 10/2012 | Huai | H04N 7/148 |
| | | | 709/205 |
| 8,531,942 B2 | 9/2013 | Büttner et al. | |
| 8,655,512 B2 | 2/2014 | Floreani et al. | |
| 8,832,341 B2 * | 9/2014 | Cole | G06F 13/426 |
| | | | 710/110 |
| 2002/0181392 A1 | 12/2002 | Okuno | |
| 2003/0065730 A1 * | 4/2003 | Jones | H04L 12/403 |
| | | | 709/208 |
| 2003/0088635 A1 * | 5/2003 | Chen | G06F 15/17375 |
| | | | 709/208 |
| 2003/0110409 A1 | 6/2003 | Gale et al. | |
| 2005/0138461 A1 | 6/2005 | Allen et al. | |
| 2006/0020740 A1 | 1/2006 | Bartley et al. | |
| 2007/0118721 A1 * | 5/2007 | Stewart | G06F 15/17375 |
| | | | 712/15 |
| 2008/0151882 A1 | 6/2008 | Sanjay et al. | |
| 2008/0298321 A1 * | 12/2008 | Lee | H04L 12/5692 |
| | | | 370/331 |
| 2009/0235001 A1 * | 9/2009 | Buttner | H04L 12/40202 |
| | | | 710/110 |
| 2010/0005366 A1 | 1/2010 | Dell et al. | |
| 2010/0205398 A1 * | 8/2010 | Maeda | G06F 11/3433 |
| | | | 712/31 |
| 2011/0055407 A1 * | 3/2011 | Lydon | G06F 13/385 |
| | | | 709/228 |
| 2011/0066779 A1 | 3/2011 | Bogenberger et al. | |
| 2012/0043830 A1 | 2/2012 | Wehrle et al. | |
| 2012/0271979 A1 * | 10/2012 | Considine | G06F 13/4027 |
| | | | 710/306 |
| 2012/0278656 A1 | 11/2012 | Berkhahn et al. | |
| 2013/0094599 A1 | 4/2013 | Itoigawa | |

* cited by examiner

ND METHOD TO TRANSMIT
SYSTEM AND METHOD TO TRANSMIT DATA OVER A BUS SYSTEM

This application is a continuation of U.S. patent application Ser. No. 13/480,281, filed on May 24, 2012, which application is hereby incorporated herein by reference in its entirety.

TECHNICAL FIELD

The invention generally relates to an electrical or electronic system, and in specific embodiments, to a system comprising a bus, and a method to transmit data over a bus system.

BACKGROUND

In electrical or electronic systems, various individual system modules, for instance various electronic/electric assemblies, various electronic/electric components, for instance various semiconductor components such as integrated circuits, etc., various sub-components, provided in one and the same component or integrated circuit etc., communicate via a transfer medium such as a bus system.

A bus system may comprise one or more transfer lines. Bus systems can be used jointly by two or more than two components of a respective system.

Many conventional bus systems comprise several partial systems, for example a data bus consisting of one or more data lines, and/or an address bus consisting of one or more address lines, and/or a control bus consisting of one or more control lines, etc.

In comparison to this, other bus systems are of a much simpler construction. For example, a so-called IBCB bus (IBCB=Inter Block Communication Bus) in general merely comprises two transmission lines to connect two respective components.

Further examples for relatively simple bus systems are CAN busses (CAN=Controller Area Network), which generally only comprise two or three lines (e.g., CAN_HIGH, CAN_LOW, and—optionally—CAN_GND (ground)), LIN busses (LIN=Local Interconnect Network), which generally comprise only one single transmission line, etc.

In many conventional systems, for instance, in systems with an IBCB bus, various components may be connected in a chain-like structure. For instance, a first component may be connected via two IBCB transmission lines to a second component, the second component may be connected via two IBCB transmission lines to a third component, the third component may be connected via two IBCB transmission lines to a fourth component, etc. Hence, e.g., a logical "1" (or correspondingly, a logical "o") may first be transmitted from the first component to the second component in the above chain of components, then from the second component to the third component, then from the third component to the fourth component, etc.

In addition, a central microprocessor or microcontroller may be provided, which e.g., may be connected with the first component in the above chain of components, e.g., via SPI (SPI=Serial Peripheral Interface), or any other suitable connection.

However, if any of the above IBCB transmission lines does not work (e.g., a transmission line between the first and second component or, e.g., a transmission line between the second and third component, etc.) the whole system does not work anymore.

For these or other reasons there is a need for improved systems and methods to transmit data over a bus system.

SUMMARY OF THE INVENTION

In one embodiment, a system comprises a bus system to connect a plurality of components in a chain-like structure. A first microcontroller or microprocessor is adapted to control the plurality of components in a first mode of the system. A second microcontroller or microprocessor adapted to control a first subset of the plurality of components in a second mode of the system.

BRIEF DESCRIPTION OF THE DRAWINGS

The accompanying drawings are included to provide a further understanding of the present invention and are incorporated in and constitute a part of this specification. The drawings illustrate embodiments of the present invention and together with the description serve to explain the principles of the invention. Other embodiments of the present invention and many of the intended advantages of the present invention will be readily appreciated, as they become better understood by reference to the following detailed description.

DETAILED DESCRIPTION OF ILLUSTRATIVE EMBODIMENTS

In the following detailed description, reference is made to the accompanying drawings, which form a part hereof, and in which is shown by way of illustration specific embodiments in which the invention may be practiced. It is to be understood that other embodiments may be utilized and structural or other changes may be made without departing from the scope of the present invention. The following detailed description, therefore, is not to be taken in a limiting sense, and the scope of the present invention is defined by the appended claims.

Figures 1, 1A:
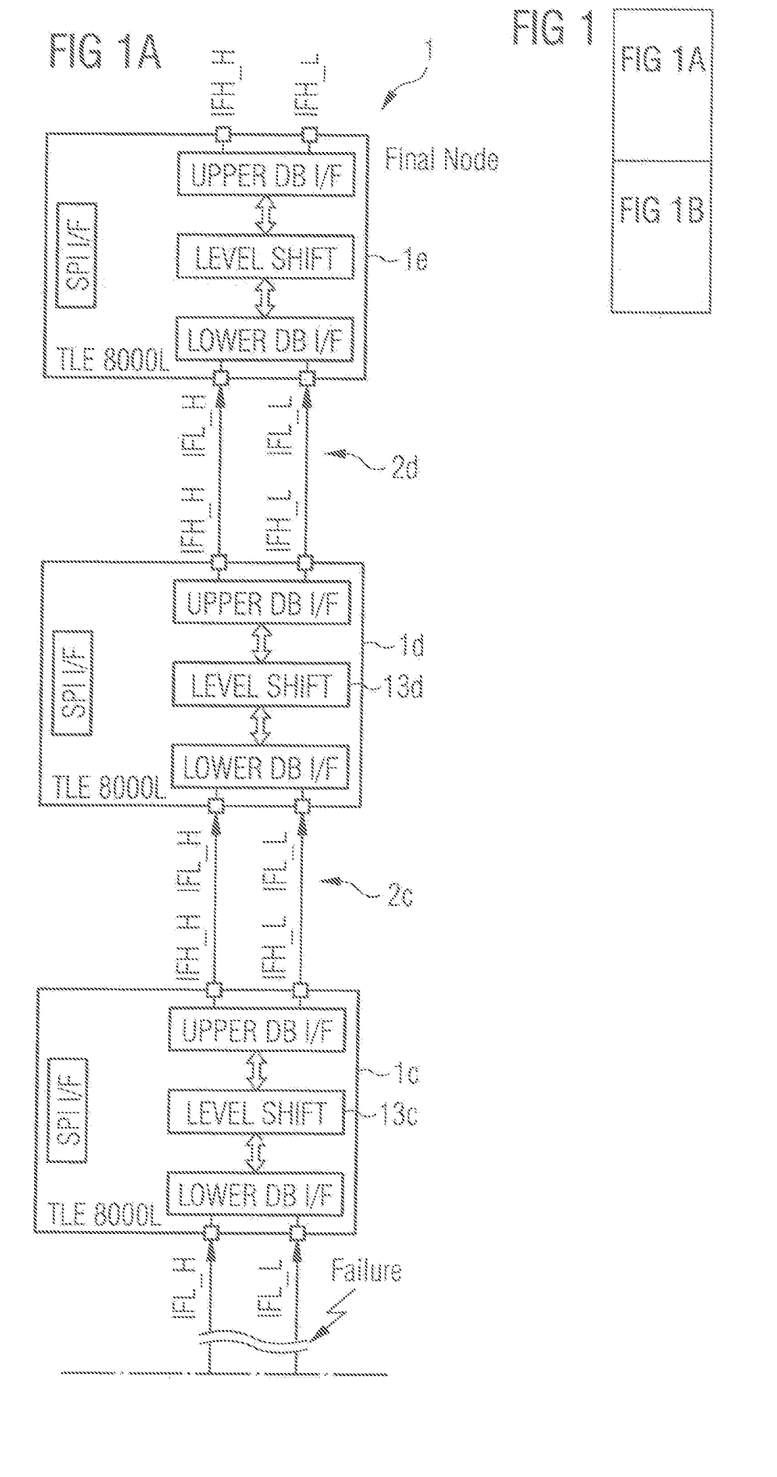
FIG. 1 depicts a schematic structure of a conventional electronic/electric system comprising a plurality of components which are connected in a chain-like structure over various busses.
Figure 1B:
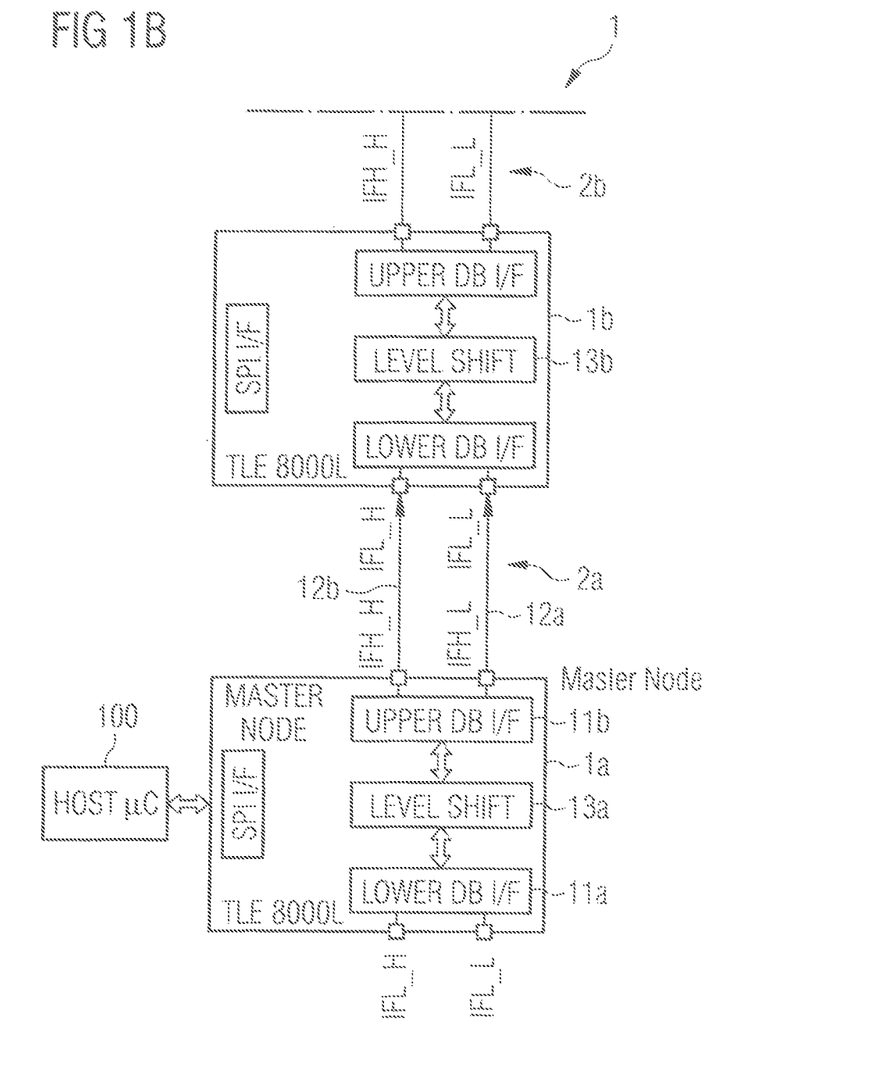

FIG. 1 shows a schematic representation of a conventional electronic/electric system 1 comprising a plurality of components 1a, 1b, 1c, 1d which are connected in a chain-like structure over various busses 2a, 2b, 2c, 2d. The components can include any type of module, element or component.

The components 1a, 1b, 1c, 1d may, e.g., be or comprise semiconductor components such as integrated circuits 1a, 1b, 1c, 1d, for instance, respective ASICs (ASIC=application specific integrated circuit), microprocessors, microcontrollers, etc., or any other kind of integrated circuit or component comprising an integrated circuit. In one particular embodiment, the components may be or comprise respective BALI ASICS (BALI=Battery Management for Lithium Ion Cells) 1a, 1b, 1c, 1d, etc.

The system 1 may comprise a relatively high number of components 1a, 1b, 1c, 1d, e.g., more than two, in particular examples, more than five or ten or twenty components 1a, 1b, 1c, 1d, e.g., more than five or ten or twenty separate integrated circuits, connected in the above chain-like structure over the above busses 2a, 2b, 2c, 2d.

Each of the busses 2a, 2b, 2c, 2d, e.g., may comprise, as shown in FIG. 1, two respective transmission lines 12a, 12b, over which data may, e.g., be transmitted in differential form.

For example, the busses 2a, 2b, 2c, 2d may be respective IBCB busses (IBCB=Inter Block Communication Bus).

The above busses 2a, 2b, 2c, 2d may be used, e.g., to transmit data referring to detected electric charge loaded in respective cells/block of cells associated with a respective one of the integrated circuits 1a, 1b, 1c, 1d—or any other kind of data—from the respective integrated circuit 1a, 1b, 1c, 1d to a central control device 100, e.g., a respective Battery Management Supervisor Controller, and/or to other ones of the above integrated circuits 1a, 1b, 1c, 1d, and/or vice versa (e.g., from the central control device/Battery Management Supervisor Controller 100 to the above integrated circuits 1a, 1b, 1c, 1d). The control device boo can be a microprocessor or a microcontroller or any other component that performs the functions described herein. The above central control device boo/Battery Management Supervisor Controller may be, e.g., connected with the first integrated circuit 1a in the above chain of integrated circuits 1a, 1b, 1c, 1d, e.g., a respective "Master Node" circuit 1a. The connection between the central control device 100 and the "Master Node" circuit 1a, e.g., may be achieved via SPI (SPI=Serial Peripheral Interface), or any other suitable connection.

The above central control device 100/Battery Management Supervisor Controller, in turn, may be connected to the main control device of the vehicle, e.g., via a respective CAN bus (CAN=Controller Area Network), or any other suitable connection.

Each of the above components 1a, 1b, 1c, 1d of the system 1, e.g., each of the above integrated circuits 1a, 1b, 1c, 1d may comprise a first interface, e.g., a LS Interface 11a, a second interface, e.g., a Highside Interface (HS Interface) 11b, and—optionally—a Level shifter 13a, 13b, 13c, 13d connected between the LS Interface 11a, and the HS Interface 11b. Each Level shifter 13a, 13b, 13c, 13d may be connected with the respective additional logic circuits of a respective integrated circuit 1a, 1b, 1c, 1d.

Hence, a respective data signal may e.g., be transmitted from the integrated circuit 1a, i.e., the "Master Node" circuit is (in a particular example, the respective HS Interface rib thereof) via the bus 2a to the integrated circuit 1b (in a particular example, the respective LS Interface thereof). By the Level Shifter 13b of the integrated circuit 1b the received data signal is shifted from the voltage domain of the ASIC is to the voltage domain of the ASIC 1b. Then, the voltage shifted received data signal may, e.g., be transmitted from the integrated circuit 1b (in a particular example, the respective HS Interface thereof) via the bus 2b to the integrated circuit 1c (in a particular example, the respective LS Interface thereof).

Thereafter, by the Level Shifter 13c of the integrated circuit is the received data signal is shifted from the voltage domain of the ASIC 1b to the voltage domain of the ASIC 1c. Then, the voltage shifted received data signal may e.g., be transmitted from the integrated circuit is (in a particular example, the respective HS Interface thereof) via the bus 2c to the integrated circuit 1d (in a particular example, the respective LS Interface thereof). By the Level Shifter 13d of the integrated circuit 1d the received data signal is shifted from the voltage domain of the ASIC 1c to the voltage domain of the ASIC 1d, and is then transmitted from the integrated circuit 1d (in a particular example, the respective HS Interface thereof) via the bus 2d to the next ASIC in the chain, etc., etc., until the data signal is received by the last ASIC 1e in the chain ("Final Node" circuit 1e).

Each integrated circuit 1a, 1b, 1c, 1d, (e.g., each of the above Level shifters) may, e.g., shift the level of the data signals by a relatively high voltage amount, e.g., between 1V and 200 V, in particular examples, between 5V and 100 V, or between by and 80V, e.g., up to 60V.

The busses 2a, 2b, 2c, 2d hence may be seen as commonly forming a bus system, where the separate buses 2a, 2b, 2c, 2d are galvanically decoupled from one another.

However, if any of the above busses 2a, 2b, 2c, 2d, or any of the above transmission lines 12a, 12b of the busses 2a, 2b, 2c, 2d does not work (e.g., as shown in FIG. 1, the bus 2b between the integrated circuit 1b, and the integrated circuit 1c, e.g., due to a failure in one or both transmission lines of the respective bus 2b), the whole system 1 does not work anymore.

Figure 2:
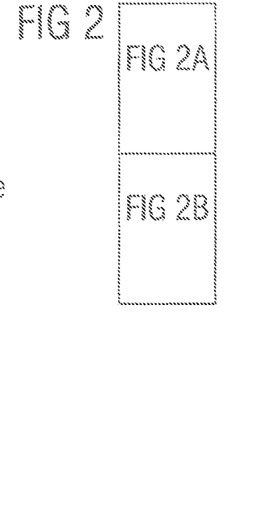
FIG. 2 depicts a schematic structure of an electronic/electric system according to an embodiment of the invention comprising a plurality of components which are connected in a chain-like structure over various busses.
Figure 2A:
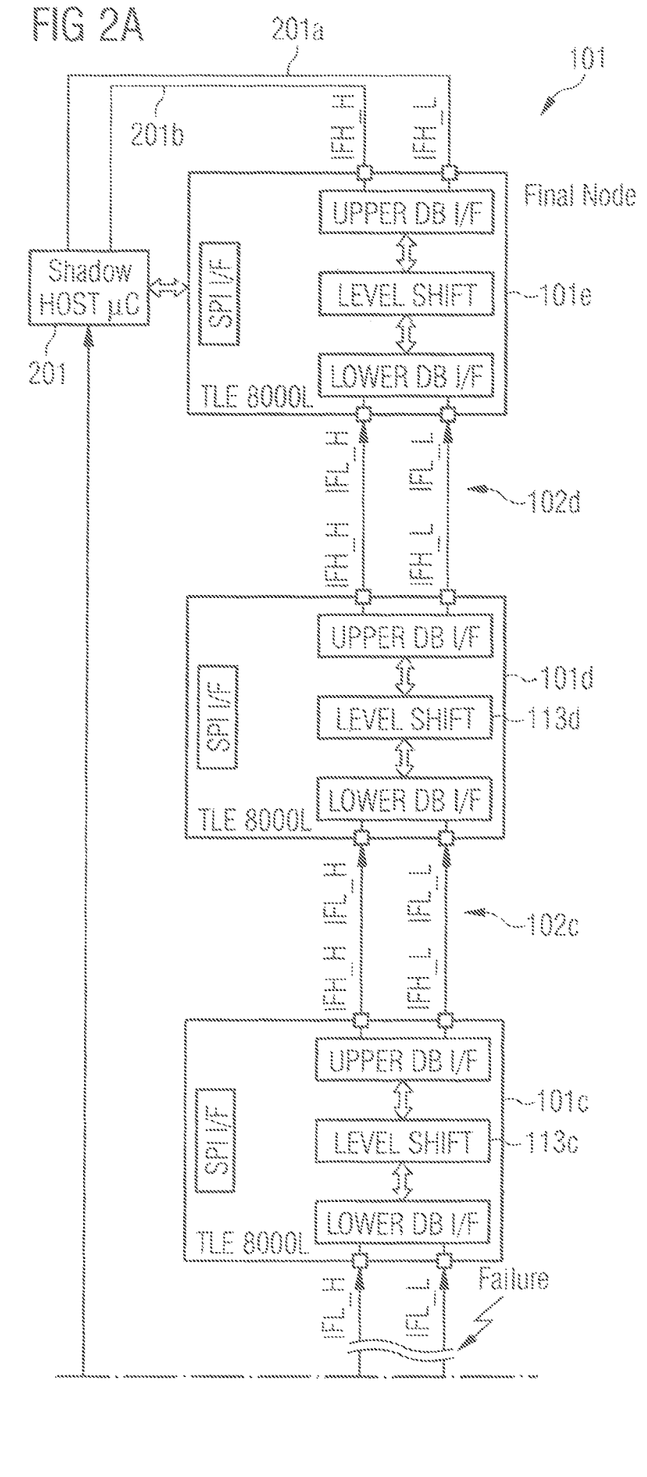
Figure 2B:
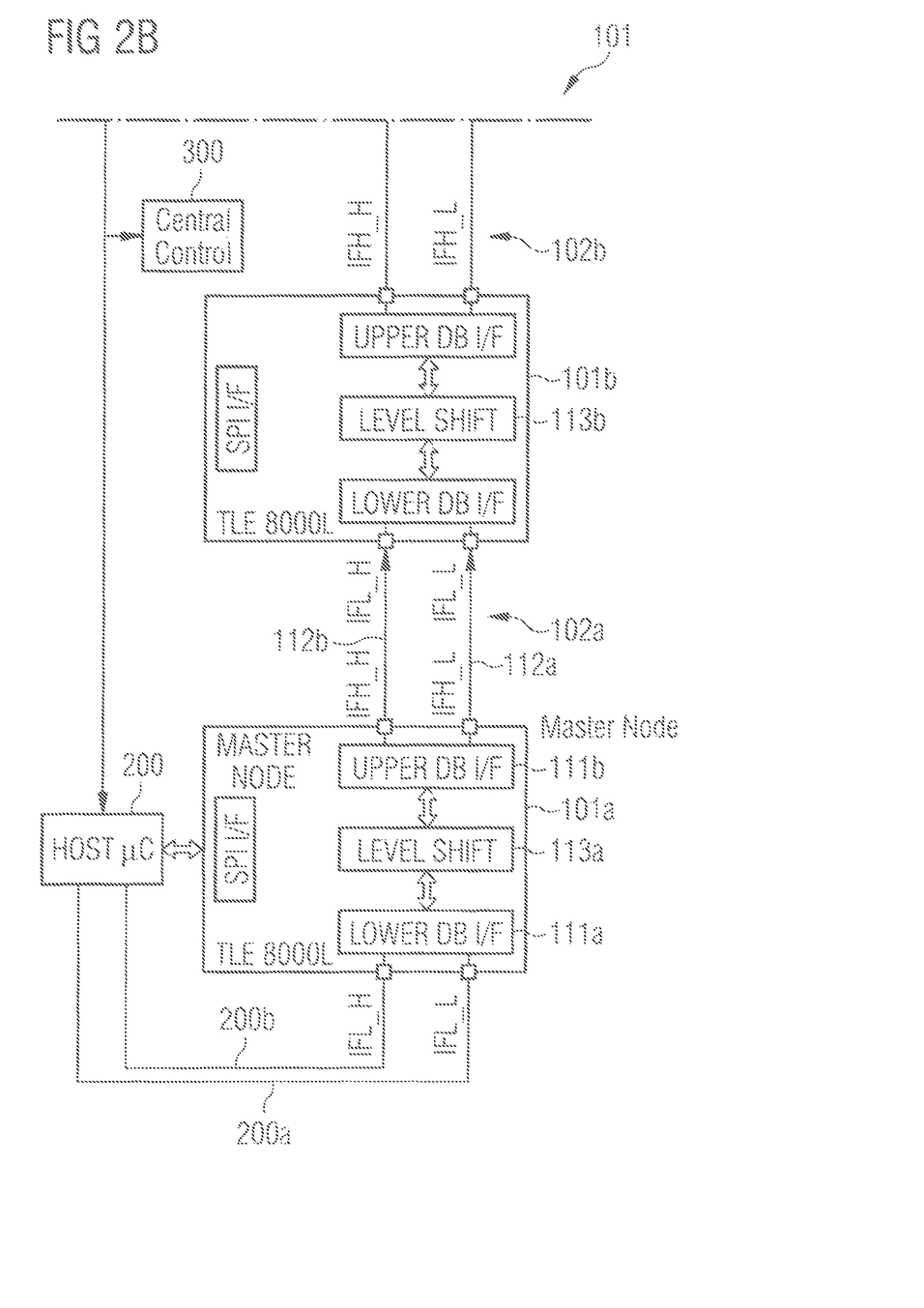

FIG. 2 shows a schematic representation of an electronic/electric system 101 according to an embodiment of the invention.

As is shown in FIG. 2, the system comprises a plurality of components 101a, 101b, 101c, 101d which are connected in a chain-like structure over various busses 102a, 102b, 102c, 102d.

The components 101a, 101b, 101c, 101d may be or comprise, e.g., semiconductor components such as integrated circuits 101a, 101b, 101c, 101d, for instance, respective ASICs, microprocessors, microcontrollers, etc., or any other kind of integrated circuit or component comprising an integrated circuit. In particular embodiments, the components may be or comprise respective BALI ASICS (BALI=Battery Management for Lithium Ion Cells) 101a, 101b, 101c, 101d, etc.

Alternatively, the system 101 may be, e.g., a single integrated circuit chip, comprising various sub-components 101a, 101b, 101c, 101d, provided in one and the same single integrated circuit chip 101, the various sub-components 101a, 101b, 101c, 101d of the single integrated circuit chip 101 being connected in a chain-like structure over various chip-internal busses 102a, 102b, 102c, 102d.

Preferably, the system 101 comprises a relatively high number of components 101a, 101b, 101c, 101d, e.g., more than two, in particular embodiments, more than five or ten or twenty components 101a, 101b, 101c, 101d, e.g., more than five or ten or twenty separate integrated circuits (or sub-components of a single integrated circuit), connected in the above chain-like structure over the above busses 102a, 102b, 102c, 102d.

Each of the busses 102a, 102b, 102c, 102d may, e.g., comprise—as shown in FIG. 2—two respective transmission lines 112a, 112b, over which data may be transmitted in differential form. Alternatively, each bus may, e.g., only comprise one single transmission line, or more than two, e.g., three or more than three transmission lines.

For example, the busses 102a, 102b, 102c, 102d may be respective IBCB busses (IBCB=Inter Block Communication Bus), or any other kind of busses (e.g., respective CAN busses (CAN=Controller Area Network), LIN busses (LIN=Local Interconnect Network), or similar busses, etc.).

The above system 101 may, e.g., be used in a vehicle, such as a car, a plane, a helicopter, a motorcycle, etc. In advantageous embodiment, the system 101 is used in a car with an electric engine (and/or a combustion engine, such as a hybrid).

For instance, the system 101 may be used to control a battery, e.g., a battery provided in an electric vehicle, or any other battery provided, e.g., in any of the above-mentioned vehicles.

In the battery, several cells, e.g., respective Lithium Ion Cells, or any other kind of cells may be connected in series. The series connection of the cells may result in the battery providing a total voltage of more than ten, preferably more than hundred, two-hundred or five-hundred volts.

Each of the above components 101a, 101b, 101c, 101d of the system 101, e.g., each of the above integrated circuits 101a, 101b, 101c, 101d may be used to monitor and/or control different ones of the above cells, and/or different blocks of cells/battery modules, each block of cells/battery module comprising several, different ones of the cells.

For instance, a first integrated circuit 101a of the above integrated circuits 101a, 101b, 101c, 101d may be used to monitor and/or control a first cell, and/or a first battery module, a second integrated circuit 101b of the above integrated circuits 101a, 101b, 101c, 101d may be used to monitor and/or control a second cell, and/or a second battery module, a third integrated circuit 101c of the above integrated circuits 101a, 101b, 101c, 101d may be used to monitor and/or control a third cell, and/or a third battery module, a fourth integrated circuit 101d of the above integrated circuits 101a, 101b, 101c, 101d may be used to monitor and/or control a fourth cell, and/or a fourth battery module, etc.

Thereby, e.g., the electric charge loaded in the respective cells/block of cells associated with a respective integrated circuit 101a, 101b, 101c, 101d may be detected by a respective integrated circuit 101a, 101b, 101c, 101d. Alternatively or in addition thereto, with the help of a respective integrated circuit 101a, 101b, 101c, 101d, an appropriate reaction to a detected electric charge loaded in respective cells/blocks of cells may be controlled. For instance, by use of a respective integrated circuit 101a, 101b, 101c, 101d, a single associated cell, and/or an associated block of cells may be discharged (passive balancing). Further, by use of a respective integrated circuit 101a, 101b, 101c, 101d, charge may be transferred between single cells, and/or respective blocks of cells (active balancing).

As is shown in FIG. 2, other than with conventional systems, more than one central control device 200, 201, e.g., more than one respective Battery Management Supervisor Controller 200, 201 may be used to help to control the above components 101a, 101b, 101c, 101d, connected in the above chain-like structure over the above busses 102a, 102b, 102c, 102d, e.g., two (or even more, e.g., three or four) central microprocessors or microcontrollers 200, 201/Battery Management Supervisor Controllers 200, 201.

As will be described in further detail below, the above busses 102a, 102b, 102c, 102d e.g., may be used to transmit data referring to the detected electric charge loaded in respective cells/block of cells associated with a respective one of the integrated circuits 101a, 101b, 101c, 101d—or any other kind of data—from the respective integrated circuit 101a, 101b, 101c, 101d to e.g., the above first central control device 200/Battery Management Supervisor Controller 200 (and/or to the above second central control device 201/Battery Management Supervisor Controller 201, see explanations below), and/or e.g., to other ones of the above integrated circuits 101a, 101b, 101c, 101d (or a subset thereof, see explanations below), and/or vice versa (e.g., from the first central control device/Battery Management Supervisor Controller 200 to the above integrated circuits 101a, 101b, 101c, 101d, or a subset thereof (and/or e.g., from the second central control device/Battery Management Supervisor Controller 201 to the above integrated circuits 101a, 101b, 101c, 101d, or a subset thereof, see explanations below).

The above first central control device 200/Battery Management Supervisor Controller e.g., may be connected with the first integrated circuit 101a in the above chain of integrated circuits 101a, 101b, 101c, 101d, e.g., a respective "Master Node" circuit 101a. The connection between the first central control device 200 and the "Master Node" circuit 101a, e.g., may be achieved via SPI (SPI=Serial Peripheral Interface), or any other suitable connection.

The above first central control device 200/Battery Management Supervisor Controller, in turn, may be connected to a central control device 300 of the vehicle, e.g., via a respective CAN bus (CAN=Controller Area Network), or via SPI, or any other suitable connection.

Correspondingly similar, the above second central control device 201/Battery Management Supervisor Controller e.g., may be connected with a last integrated circuit 101e in the above chain of integrated circuits 101a, 101b, 101c, 101d, e.g., a respective "Final Node" circuit 101e. The connection between the second central control device 201 and the "Final Node" circuit 101e, e.g., may be achieved via SPI (SPI=Serial Peripheral Interface), or any other suitable connection.

The above second central control device 201/Battery Management Supervisor Controller, in turn, may be connected to the central control device 300 of the vehicle, e.g., via a respective CAN bus (CAN=Controller Area Network), or via SPI, or any other suitable connection.

As is shown in FIG. 2, each of the above components 101a, 101b, 101c, bold of the system 101, e.g., each of the above integrated circuits 101a, 101b, 101c, bold may comprise a first interface, e.g., a LS Interface 111a, a second interface, e.g., a HS Interface 111b, and—optionally—a Level shifter 113a, 113b, 113c, 113d connected between the LS Interface 111a, and the HS Interface 111b. Each Level shifter 113a, 113b, 113c, 113d may be connected with the respective additional logic circuits of a respective integrated circuit 101a, 101b, 101c, 101d.

Other than with conventional systems, the above first central control device 200/Battery Management Supervisor Controller is connected via respective additional transmission lines, e.g., two additional transmission lines 200a, 200b to the LS Interface of the integrated circuit 101a, i.e., the "Master Node" circuit 101a.

Further, the above second central control device 201/ Battery Management Supervisor Controller is connected via respective further additional transmission lines, e.g., two further additional transmission lines 201a, 201b to the HS Interface of the integrated circuit 101e, i.e., the "Final Node" circuit 101e.

At the beginning of a first operational mode of the system 101, e.g., after Reset/Power Down, and, e.g., triggered by the central control device 300, a respective wake request may be sent out from the first central control device 200/ Battery Management Supervisor Controller to the first component 101a in the above chain (i.e., the "Master Node" circuit 101a), and then to the other components/integrated circuits 101b, 101c, 101d, 101e in the chain. The wake request e.g., may be a data signal comprising a specific, predetermined sequence of bits, for instance, a specific, predetermined combination of logical "1"s and logical "0"s transmitted consecutively from the above first central control device 200/Battery Management Supervisor Controller to the "Master Node" circuit 101a, and then from one circuit in the above chain to the other to the above last circuit 101e in the above chain, i.e., the above "Final Node" circuit 101e.

Hence, a respective wake request data signal may, e.g., be transmitted from the first central control device 200/Battery Management Supervisor Controller via the above additional transmission lines 200a, 200b to the integrated circuit 101a, i.e., the "Master Node" circuit 101a (in a particular example, the respective LS Interface 111a thereof).

By the Level Shifter 113a of the integrated circuit 101a the received wake request data signal is shifted from the voltage domain of the first central control device 200 to the voltage domain of the ASIC 101a. Then, the voltage shifted received wake request data signal may be transmitted from the integrated circuit 101a (in a particular example, the respective HS Interface 111b thereof) via the bus 102a to the integrated circuit 101b (in a particular example, the respective LS Interface thereof).

By the Level Shifter 113b of the integrated circuit 101b the received wake request data signal is shifted from the voltage domain of the ASIC 101a to the voltage domain of the ASIC 101b. Then, the voltage shifted received wake request data signal may, e.g., be transmitted from the integrated circuit 101b (in a particular example, the respective HS Interface thereof) via the bus 102b to the integrated circuit 101c (in a particular example, the respective IS Interface thereof).

Thereafter, by the Level Shifter 113c of the integrated circuit 101c the received wake request data signal is shifted from the voltage domain of the ASIC 101b to the voltage domain of the ASIC 101c. Then, the voltage shifted received wake request data signal may e.g., be transmitted from the integrated circuit 101c (in a particular example, the respective HS Interface thereof) via the bus 102c to the integrated circuit 101d (in a particular example, the respective LS Interface thereof). By the Level Shifter 113d of the integrated circuit 101d the received wake request data signal is shifted from the voltage domain of the ASIC 101c to the voltage domain of the ASIC 101d, and is then transmitted from the integrated circuit 101d (in a particular example, the respective HS Interface thereof) via the bus 102d to the next ASIC in the chain, etc., etc., until the wake request data signal is received by the last ASIC 101e in the chain ("Final Node" circuit 101e).

Each integrated circuit 101a, 101b, 101c, 101d, (e.g., each of the above Level shifters) may shift the level of the data signals by a relatively high voltage amount, e.g., between 1V and 200 V, in particular embodiments, between 5V and 100 V, or between 10V and 80V, e.g., up to 60V.

The busses 102a, 102b, 102c, 102d hence may be seen as commonly forming a bus system, where the separate buses 102a, 102b, 102c, 102d are galvanically decoupled from one another.

In addition, in some embodiments, the galvanic connection between respective HS and LS Interfaces of two different ones of the above integrated circuits provided by a respective one of the above busses 102a, 102b, 102c, 102d (e.g., the galvanic connection between the HS Interface 111b of the integrated circuit 101a and the LS Interface of the integrated circuit 101b provided by the bus 102a, etc.) may be interrupted by a respective series connection of capacitors.

In response to detecting that the above wake request data signal is received at a respective LS Interface of a respective integrated circuit 101a, 101b, 101c, 101d, 101e in the chain, the respective integrated circuit 101a, 101b, 101c, 101d, 101e detects that it needs to change from a first to a second state, e.g., from a passive to an active state ("wake up"), and that the above first operational mode of the system 101 has started.

In the first operational mode of the system lot, the first central control device 200 (e.g., Battery Management Supervisor Controller) is in an active state, and the second central control device 201 (e.g., Battery Management Supervisor Controller) is in a passive state. Hence, in the first operational mode of the system 101, the first central control device 200, but not the second central control device 201 is used to help to control the system including components 101a, 101b, 101c, 101d, 101e in the above chain.

In the first operational mode of the system 101, for example, after the above "wake up" of the integrated circuits, correspondingly similar as in conventional systems, a respective data signal, e.g., may be transmitted from the integrated circuit 101a, i.e., the "Master Node" circuit 101a (in a particular example, the respective HS Interface 111b thereof) via the bus 102a to the integrated circuit 101b (in a particular example, the respective LS Interface thereof). By the Level Shifter 113b of the integrated circuit 101b the received data signal is shifted from the voltage domain of the ASIC 101a to the voltage domain of the ASIC 101b. Then, the voltage shifted received data signal may e.g., be transmitted from the integrated circuit 101b (in a particular example, the respective HS Interface thereof) via the bus 102b to the integrated circuit 101c (in a particular example, the respective LS Interface thereof).

Thereafter, by the Level Shifter 113c of the integrated circuit 101c the received data signal is shifted from the voltage domain of the ASIC 101b to the voltage domain of the ASIC 101c. Then, the voltage shifted received data signal may e.g., be transmitted from the integrated circuit 101c (in a particular example, the respective HS Interface thereof) via the bus 102c to the integrated circuit 101d (in a particular example, the respective IS Interface thereof). By the Level Shifter 113d of the integrated circuit 101d the received data signal is shifted from the voltage domain of the ASIC 101c to the voltage domain of the ASIC 101d, and is then transmitted from the integrated circuit 101d (in a particular example, the respective HS Interface thereof) via the bus 102d to the next ASIC in the chain, etc., etc., until the data signal is received by the last ASIC 101e in the chain ("Final Node" circuit 101e).

Conversely, in the first operational mode of the system 101 (e.g., after the above "wake up" of the integrated circuits and also correspondingly similar as in conventional system), a respective data signal may also be transmitted in the opposite direction, e.g., from the integrated circuit 101e, i.e., the "Final Node" circuit 101e (in a particular example, the respective Lowside Interface (IS Interface)) via the bus 102d to the integrated circuit 101d (in a particular example, the respective HS Interface thereof). After level shifting the data signal, it may then be transmitted from the integrated circuit 101d (in a particular example, the respective IS Interface thereof) via the bus 102c to the integrated circuit 101c (in a particular example, the respective HS Interface thereof), etc., etc., until the data signal is received by the first ASIC 101a in the chain ("Master Node" circuit 101a).

If any of the above busses 102a, 102b, 102c, 102d, or any of the above transmission lines 112a, 112b of the busses 102a, 102b, 102c, 102d does not work (e.g., as shown in FIG. 2, the bus 102b between the integrated circuit 101b, and the integrated circuit 101c, e.g., due to a failure in one or both transmission lines of the respective bus 102b), the system 101 is brought from the above first to a second operational mode.

At the beginning of the second operational mode, the second central control device 201/Battery Management Supervisor Controller 201 is brought from the above passive into an active state, such that then both the first, and the second central control device 200, 201/Battery Management Supervisor Controller 200, 201 are in an active state.

Hence, in the second operational mode of the system 101, both the first and the second central control device 200, 201 are used to help to control the system 101, i.e., the above components 101a, 101b, 101c, 101d, 101e in the above chain.

In the second operational mode of the system 101, the first central control device 200 is used to help to control the components "upstream" (see arrow B) of the failure (e.g., the modules 101a, 101b), and the second central control device 201 is used to help to control the components "downstream" (see arrow A) of the failure (e.g., the modules 101c, 101d, 101e).

To detect that a failure has occurred, e.g., during the above first operational mode of the system 101, a timeout control signal may be sent on a regular basis—e.g., triggered by the first central control device 200—from the integrated circuit 101a, i.e., the "Master Node" circuit 101a via the bus 102a to the integrated circuit 101b, and then from the integrated circuit 101b via the bus 102b to the integrated circuit 101c, and thereafter from the integrated circuit 101c via the bus 102c to the integrated circuit 101d, etc., until the timeout control signal is received by the last ASIC 101e in the chain ("Final Node" circuit 101e).

In case that a respective integrated circuit in the above chain does not receive a respective timeout control signal (or does not receive such timeout control signal a predetermined time after a previous timeout control signal), it is detected—e.g., by the respective ASIC, and/or e.g., the respective central control device (e.g., the microprocessor 200)—that "upstream" (see arrow B) of the respective integrated circuit, a failure has occurred, and that the respective integrated circuit (and additional integrated circuits further "downstream") is/are not to be controlled by the first central control device 200 any longer, but, instead, by the second central control device 201.

In this case, a respective error detection signal may be sent e.g., by the respective central control device (e.g., the microprocessor 200) to the above central control device 300. Further, the respective integrated circuit may change from the above active state to a passive, e.g., a timeout state.

In response to receiving the error detection signal, the central control device 300 may bring the system 101 from the above first to the above second operational mode, and may send respective operational mode change signals to the first and second central control device 200, 201/Battery Management Supervisor Controller 200, 201.

The second central control device 201/Battery Management Supervisor Controller 201 may then change from the above passive into the above active state.

At the beginning of the second operational mode of the system 101, according to an embodiment, and e.g., triggered by the central control device 300, a respective wake request may be sent out from the second central control device 201/Battery Management Supervisor Controller to the last component/integrated circuit 101e in the above chain (i.e., the "Final Node" circuit 101e), and then to other components/integrated circuits 101d, 101c in the chain, till the above bus with a failure is reached (i.e., to the components "downstream" (see arrow A) of the failure (e.g., the modules 101d, 101c)).

The wake request e.g., may be a data signal comprising a specific, predetermined sequence of bits, for instance, a specific, predetermined combination of logical "1"s and logical "0"s transmitted consecutively from the above second central control device 201/Battery Management Supervisor Controller to the "Final Node" circuit 101e, and then from one circuit in the above chain to the other.

Hence, a respective wake request data signal may e.g., be transmitted from the second central control device 201/Battery Management Supervisor Controller via the above additional transmission lines 201a, 201b to the integrated circuit 101e, i.e., the "Final Node" circuit 101e (in a particular example, the respective HS Interface thereof).

By the Level Shifter of the integrated circuit 101e the received wake request data signal is shifted from the voltage domain of the second central control device 201 to the voltage domain of the ASIC 101e. Then, the voltage shifted received wake request data signal may e.g., be transmitted from the integrated circuit 101e (in a particular example, the respective S Interface thereof) via the bus 102d to the integrated circuit 101d (in a particular example, the respective HS Interface thereof).

By the Level Shifter of the integrated circuit 101d the received wake request data signal is shifted from the voltage domain of the ASIC 101e to the voltage domain of the ASIC 101d. Then, the voltage shifted received wake request data signal may e.g., be transmitted from the integrated circuit 101d (in a particular example, the respective IS Interface thereof) via the bus 102c to the integrated circuit 101c (in a particular example, the respective HS Interface thereof).

In response to detecting that the above wake request data signal is received at a respective HS Interface of a respective integrated circuit 101e, 101d, 101c in the chain, the respective integrated circuit 101e, 101d, 101c detects that it needs to change from the above passive, e.g., the above timeout state (again) to an active state ("wake up"), and that the above second operational mode of the system 101 has started.

In the second operational mode of the system 101, as mentioned above, the first central control device 200 is used to help to control the components "upstream" (see arrow B) of the failure (e.g., the modules 101a, 101b), and the second central control device 201 is used to help to control the components "downstream" (see arrow A) of the failure (e.g., the modules 101c, 101d, 101e).

Further, in the second operational mode of the system 101, the integrated circuit 101a may act as "Master Node" for the components "upstream" (see arrow B) of the failure (e.g., the module 101b), and the integrated circuit 101e may act as "Master Node" for the components "downstream" (see arrow A) of the failure (e.g., the modules 101d, 101c).

In the second operational mode of the system 101, under control of the first central control device 200, a respective data signal may e.g., be transmitted from the integrated circuit 101b (in a particular example, the respective LS Interface thereof) via the bus 102a to the integrated circuit 101a (in a particular example, the respective HS Interface thereof). After level shifting the data signal, it may then be transmitted from the integrated circuit 101a to e.g., the first central control device 200. Vice versa, a respective data signal may e.g., be transmitted from the first central control device 200 to the integrated circuit 101a, and then via the bus 102a to the integrated circuit 101b.

Correspondingly, under control of the second central control device 201, a respective data signal may e.g., be transmitted from the integrated circuit 101c (in a particular example, the respective HS Interface thereof) via the bus 1012c to the integrated circuit 101d (in a particular example, the respective LS Interface thereof). After level shifting the data signal, it may then be transmitted from the integrated circuit 101d (in a particular example, the respective HS Interface thereof) via the bus 102d to the integrated circuit 101e (in a particular example, the respective LS Interface thereof). After level shifting the data signal, it may then be transmitted from the integrated circuit 101e to e.g., the second central control device 201. Vice versa, a respective data signal may e.g., be transmitted from the second central control device 201 to the integrated circuit 101e, and then via the bus 102d to the integrated circuit 101d, and then via the bus 102c to the integrated circuit 101c.

Hence, even with the above failure in the bus 102b, the system 101 works well.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of operating an integrated circuit component, the method comprising:
   transitioning the integrated circuit component from a passive state to an active state in a first operational mode by
      receiving a wake request data signal at a first port of the integrated circuit component,
      transmitting the wake request data signal from the first port of the integrated circuit component to a second port of the integrated circuit component, and
      transitioning the integrated circuit component from the passive state to the active state in the first operational mode after receiving the wake request data signal from the first port; and
   transitioning the integrated circuit component from the passive state to the active state in a second operational mode by
      receiving the wake request data signal at the second port of the integrated circuit component,
      transmitting the wake request data signal from the second port of the integrated circuit component to the first port of the integrated circuit component, and
      transitioning the integrated circuit component from the passive state to the active state in the second operational mode after receiving the wake request data signal from the second port.

2. The method of claim 1, further comprising:
   in the first operational mode,
      receiving a control signal from the first port,
      transmitting the control signal from the first port to the second port, and
      transmitting a data signal to the first port; and
   in the second operational mode,
      receiving the control signal from the second port,
      transmitting the control signal from the second port to the first port, and
      transmitting the data signal to the second port.

3. The method of claim 2, further comprising monitoring a battery cell by the integrated circuit component.

4. The method of claim 3, wherein the data signal comprises data referring to a detected electric charge loaded in the battery cell based on the monitoring.

5. The method of claim 1, further comprising:
   transitioning the integrated circuit component from the active state in the first operational mode to the passive state by
      monitoring the first port for a timeout control signal, and
      transitioning the integrated circuit component from the active state in the first operational mode to the passive state when the timeout control signal is not received from the first port within a predetermined period of time after a previous timeout control signal is received from the first port; and
   transitioning the integrated circuit component from the active state in the second operational mode to the passive state by
      monitoring the second port for the timeout control signal, and
      transitioning the integrated circuit component from the active state in the second operational mode to the passive state when the timeout control signal is not received from the second port within the predetermined period of time after the previous timeout control signal is received from the second port.

6. The method of claim 5, further comprising:
   transmitting the timeout control signal from the first port to the second port while the integrated circuit component is in the active state in the first operational mode; and
   transmitting the timeout control signal from the second port to the first port while the integrated circuit component is in the active state in the second operational mode.

7. The method of claim 1, wherein transmitting the wake request data signal from the second port of the integrated circuit component to the first port of the integrated circuit component comprises level-shifting the wake request data signal.

8. The method of claim 1, further comprising configuring the integrated circuit component to be a master node via a third port of the integrated circuit component.

9. An integrated circuit component comprising:
   a digital circuit;
   a first port coupled to the digital circuit; and
   a second port coupled to the digital circuit,
   wherein the digital circuit is configured to:
      transition the integrated circuit component from a passive state to an active state in a first operational mode by
         receiving a wake request data signal at the first port,
         transmitting the wake request data signal from the first port to the second port, and
         transitioning the integrated circuit component from the passive state to the active state in the first operational mode after receiving the wake request data signal from the first port; and
      transition the integrated circuit component from the passive state to the active state in a second operational mode by
         receiving the wake request data signal at the second port,
         transmitting the wake request data signal from the second port to the first port, and
         transitioning the integrated circuit component from the passive state to the active state in the second operational mode after receiving the wake request data signal from the second port.

10. The integrated circuit component of claim 9, wherein the digital circuit is further configured to:
in the first operational mode,
receive a control signal from the first port,
transmit the control signal from the first port to the second port, and
transmit a data signal to the first port; and
in the second operational mode,
receive the control signal from the second port,
transmit the control signal from the second port to the first port, and
transmit the data signal to the second port.

11. The integrated circuit component of claim 10, wherein the digital circuit is further configured to monitor a battery cell.

12. The integrated circuit component of claim 11, wherein the data signal comprises data referring to a detected electric charge loaded in the monitored battery cell.

13. The integrated circuit component of claim 9, wherein the digital circuit is further configured to:
transition the integrated circuit component from the active state in the first operational mode to the passive state by
monitoring the first port for a timeout control signal, and
transitioning the integrated circuit component from the active state in the first operational mode to the passive state when the timeout control signal is not received from the first port within a predetermined period of time after a previous timeout control signal is received from the first port; and
transition the integrated circuit component from the active state in the second operational mode to the passive state by
monitoring the second port for the timeout control signal, and
transitioning the integrated circuit component from the active state in the second operational mode to the passive state when the timeout control signal is not received from the second port within the predetermined period of time after the previous timeout control signal is received from the second port.

14. The integrated circuit component of claim 13, wherein the digital circuit is further configured to:
transmit the timeout control signal from the first port to the second port while the integrated circuit component is in the active state in the first operational mode; and
transmit the timeout control signal from the second port to the first port while the integrated circuit component is in the active state in the second operational mode.

15. The integrated circuit component of claim 9, further comprising a level shifter coupled between the first port and the second port.

16. The integrated circuit component of claim 9, further comprising a third port coupled to the digital circuit, wherein the digital circuit is further configured to operate as a master node based on a signal received at the third port.

17. The integrated circuit component of claim 9, wherein the digital circuit comprises a microcontroller or a microprocessor.

18. A battery management integrated circuit comprising:
a first digital interface;
a second digital interface, wherein at least one of the first digital interface or the second digital interface is configured to be coupled to a neighboring battery management integrated circuit in a chain-like structure; and
a controller coupled to the first digital interface and to the second digital interface and configured to in a first operational mode, receive a control signal from the first digital interface,
transmit the received control signal via the second digital interface, and transmit a data signal via the first digital interface, wherein the data signal comprises data referring to a detected electric charge loaded in a battery cell configured to be coupled to the battery management integrated circuit, and
in a second operational mode, receive the control signal from the second digital interface, transmit the received control signal via the first digital interface, and transmit the data signal via the first digital interface.

19. The battery management integrated circuit of claim 18, wherein the controller is further configured to:
transition the battery management integrated circuit from a passive state to an active state in the first operational mode by
receiving a wake request data signal at the first digital interface,
transmitting the wake request data signal via the second digital interface, and
transitioning the battery management integrated circuit from the passive state to the active state in the first operational mode after receiving the wake request data signal from the first digital interface; and
transition the battery management integrated circuit from the passive state to the active state in the second operational mode by
receiving the wake request data signal at the second digital interface,
transmitting the wake request data signal via the first digital interface, and
transitioning the battery management integrated circuit from the passive state to the active state in the second operational mode after receiving the wake request data signal from the second digital interface.

20. The battery management integrated circuit of claim 19, wherein the controller is further configured to:
transition the battery management integrated circuit from the active state in the first operational mode to the passive state by
monitoring the first digital interface for a timeout control signal, and
transitioning the battery management integrated circuit from the active state to the passive state when the timeout control signal is not received from the first digital interface within a predetermined period of time after a previous timeout control signal is received from the first digital interface; and
transition the battery management integrated circuit from the active state in the second operational mode to the passive state by
monitoring the second digital interface for the timeout control signal, and
transitioning the battery management integrated circuit from the active state to the passive state when the timeout control signal is not received from the second digital interface within the predetermined period of time after the previous timeout control signal is received from the second digital interface.

* * * * *